US012804726B2

(12) United States Patent
Tumula et al.

(10) Patent No.: US 12,804,726 B2
(45) Date of Patent: Nov. 17, 2026

(54) METHODS AND DEVICES FOR INITIAL ACCESS OF A UE TO A WIRELESS NETWORK

(71) Applicant: Sony Group Corporation, Tokyo (JP)

(72) Inventors: Chaitanya Tumula, Åkarp (SE); Erik Bengtsson, Eslöv (SE); Olof Zander, Södra Sandby (SE); Jose Flordelis, Lund (SE); Fredrik Rusek, Eslöv (SE); Kun Zhao, Malmö (SE); Zhinong Ying, Lund (SE)

(73) Assignee: Sony Group Corporation, Tokyo (JP)

( * ) Notice: Subject to any disclaimer, the term of this patent is extended or adjusted under 35 U.S.C. 154(b) by 227 days.

(21) Appl. No.: 18/848,008

(22) PCT Filed: Mar. 3, 2023

(86) PCT No.: PCT/EP2023/055463
§ 371 (c)(1),
(2) Date: Sep. 17, 2024

(87) PCT Pub. No.: WO2023/186451
PCT Pub. Date: Oct. 5, 2023

(65) Prior Publication Data

US 2025/0203664 A1 Jun. 19, 2025

(30) Foreign Application Priority Data

Mar. 30, 2022 (SE) .................................... 2250395-7

(51) Int. Cl.
*H04W 74/0833* (2024.01)
*H04B 17/318* (2015.01)
(Continued)

(52) U.S. Cl.
CPC ...... *H04W 74/0833* (2013.01); *H04B 17/318* (2015.01); *H04L 5/0048* (2013.01); *H04W 48/08* (2013.01)

(58) Field of Classification Search
None
See application file for complete search history.

(56) References Cited

U.S. PATENT DOCUMENTS 10,477,591 B2 11/2019 Jung et al.
11,165,616 B2 11/2021 Garcia et al.
(Continued)

FOREIGN PATENT DOCUMENTS

WO 2011017281 A1 2/2011
WO 2017011802 A1 1/2017
(Continued)

OTHER PUBLICATIONS

International Search Report from corresponding International Application No. PCT/EP2023/055463 mailed on May 9, 2023, 2 pages.
(Continued)

*Primary Examiner* — Jenee Holland
(74) *Attorney, Agent, or Firm* — Tucker Ellis LLP

(57) ABSTRACT

Method carried out in a user equipment, UE, for initial access to a wireless network comprising a plurality of access point groups, APGs, the method comprising: measuring (520) received signal power of reference signals from said APGs, wherein each APG transmits said reference signals using different radio resources; obtaining (530) random access, RA, configuration associated with one or more of said APGs; initiating RA preamble transmission (540), based on said RA configuration, to each of the APGs which meet a predetermined criterion based on the measured received signal power.

20 Claims, 7 Drawing Sheets

(51) Int. Cl.

| | |
|---|---|
| ***H04L 5/00*** | (2006.01) |
| ***H04W 8/22*** | (2009.01) |
| ***H04W 48/08*** | (2009.01) |
| ***H04W 48/12*** | (2009.01) |

(56) References Cited

U.S. PATENT DOCUMENTS

2009/0122926 A1* 5/2009 Azenkot ............. H04L 27/2647 375/343
2011/0014922 A1 1/2011 Jen
2011/0019582 A1* 1/2011 Okmyanskiy ....... H04L 41/0893 370/254
2011/0116472 A1* 5/2011 Myers ................... H04L 1/1867 370/331
2011/0149885 A1* 6/2011 Bachu ................. H04W 74/002 370/329
2014/0071957 A1* 3/2014 Xu .................... H04W 52/0219 370/336
2015/0063287 A1* 3/2015 Mazzarese ............ H04W 24/10 370/329
2017/0272319 A1* 9/2017 Sheen ................... H04W 24/02
2019/0254074 A1 8/2019 Jeon et al.
2021/0051448 A1 2/2021 Jung et al.

FOREIGN PATENT DOCUMENTS

WO 2018130873 A2 7/2018
WO 2021154443 A1 8/2021

OTHER PUBLICATIONS

Office Action and Search Report from corresponding Swedish Application No. 2250395-7, mailed on Nov. 11, 2022, 9 pages.
ZTE, "Multi-TRP Aspects of Random Access," 3rd Generation Partnership Project (3GPP) TSG RAN WG1 Meeting #86, R1-166421, Aug. 22-26, 2016, 3 pages.

* cited by examiner

METHODS AND DEVICES FOR INITIAL ACCESS OF A UE TO A WIRELESS NETWORK

TECHNICAL FIELD

The present invention relates to the field of wireless communication, in particular to solutions associated with initial access of a UE to a wireless network. Specifically, the invention relates to solutions for facilitating initial access of the UE to the wireless network.

BACKGROUND

Various standard specifications have been provided for wireless communication systems, of which some are provided under the umbrella of the 3$^{rd}$ Generation Partnership Project (3GPP). In such systems, a wireless network is provided which as such may connect to other external networks. Wireless devices, often referred to as User Equipment (UE), are configured to communicate with the wireless network over an air interface. For this purpose, the wireless network comprises an access network for radio communication with the UEs. The access network comprises a plurality of access nodes, each having an associated transmission and reception point (TRP) where an antenna of the access node is located. The UE can be configured in a connected state with respect to the access network, wherein one or more channels are set up for communication in the uplink (UL) and or downlink (DL), or be disconnected from the access network and assume an idle state. Establishing a connected state, such as moving from RRC (Radio Resource Control) idle to RRC connected, may be referred to as initial access, and may involve what is often referred to as a random access (RA) procedure or RA channel (RACH) procedure. This may involve transmitting an UL message by the UE, often referred to as an RA preamble, which forms a basis for setting up a connection, or optionally for transmitting a small amount of data during the RA procedure without continuing all the way to an established connected state. Where the RA procedure is initiated based on the wireless network having data to convey to the UE, the RA preamble transmission may be preceded by a paging process. The UE is typically configured to measure received signal strength from access nodes of the access network. The RA preamble will be transmitted to the access node from which the strongest signal is detected.

In a so-called cellular system, each access node serves one or more cells covering a certain land area. In this context, DL signals transmitted from different access nodes are identifiable by a relation to the served cell, such as by a cell ID. On the other hand, cell-free systems, also known as network MIMO (Multiple-Input Multiple-Output), distributed MIMO, and user centric systems, have gained interest in academia as well as in industry. The basic idea of cell-free systems is that a UE is served by multiple access nodes, referred to as access points (APs) simultaneously in a geographical region without the concept of cells from a UE perspective. By this it is meant that while the UE is moving within the coverage area of the wireless network, the APs serving a UE will be changing in a transparent manner to the UE without requirement of UE handover from one cell to another cell as in traditional cellular systems.

In the conventional initial access procedure of cellular systems, a UE measures the signal power associated with different cells, each defined by a single TRP or access node. As indicated above, the UE selects the cell with the best signal strength and decodes associated information broadcasted by the access node to obtain cell-related information to perform the RA procedure to connect to the cell. Even in a multi-TRP system, where multiple TRPs are connected to serve a single UE to enhance coverage or reduce latency, the initial access is performed as in a traditional system and a UE initially connects to single TRP, and subsequently receives data from two TRPs in the connected state.

One of the limitations of the traditional cellular systems is that the initial access procedure is still a point-to-point communication, limiting the coverage.

SUMMARY

It is thus an overall objective of the present invention to provide an improved solution for initial access. An aspect of this object is to overcome at least some of the problems associated with the state of the art. These objects are achieved by the combined features of the independent claims. The dependent claims define embodiments of the invention.

According to a first aspect, a method is provided which is carried out in a UE for initial access to a wireless network comprising a plurality of access point groups, APGs, the method comprising:

- measuring received signal power of reference signals from said APGs, wherein each APG transmits said reference signals using different radio resources;
- obtaining random access, RA, configuration associated with one or more of said APGs;
- initiating RA preamble transmission, based on said RA configuration, to each of the APGs which meet a predetermined criterion based on the measured received signal power.

According to a second aspect, a method is provided which is carried out in a wireless network comprising a plurality of access point groups, APGs, for facilitating initial access of a UE, wherein the method comprises:

- allocating random access, RA, resources for RA preamble reception;
- transmitting, by said APGs, reference signals usable for UE obtainment of RA configuration which identifies said RA resources, wherein each APG transmits said reference signals using different radio resources;
- receiving at least one RA preamble from the UE, wherein the UE is configured for RA preamble transmission to each APG for which measured received signal power of said reference signals meets a predetermined criterion.

By means of the proposed solution, which provides an improved process for initial access, improved basis for network decision-making is obtained, inter alia related to which access points to use for supporting a UE. In cellular systems, initial access is a point-to-point communication limited by coverage. The proposed solution addresses the limitations of initial access in cellular systems by proposing cell-free initial access procedure, in which measurements associated with multiple APGs is made available to the wireless network. This has the benefit of allowing the wireless network to select the best APG to serve a UE, thereby resulting in better resource utilization. Also, by allowing the UE to perform RACH towards multiple APGs, the UE may possibly achieve a faster initial access to the network.

A further benefit of the proposed solution is that it allows for a wireless network design with APs of lower complexity. In a traditional cellular system, a single AP is fully sufficient to serve a UE. In cell-free systems, this may not be the case, where lower complexity APs with few antennas may be employed. However, the wireless network typically comprises many APs and together they can serve a UE. Therefore, it is beneficial to be able to connect to many of the APs already at initial access. The proposed solution provides for multi-point initial access, which allows for designing a wireless network with lower complexity APs where any single AP is not capable of fully serving a UE.

BRIEF DESCRIPTION OF THE DRAWINGS

The present invention will now be described in more detail with reference to the accompanying drawings.

DETAILED DESCRIPTION

Figure 1:
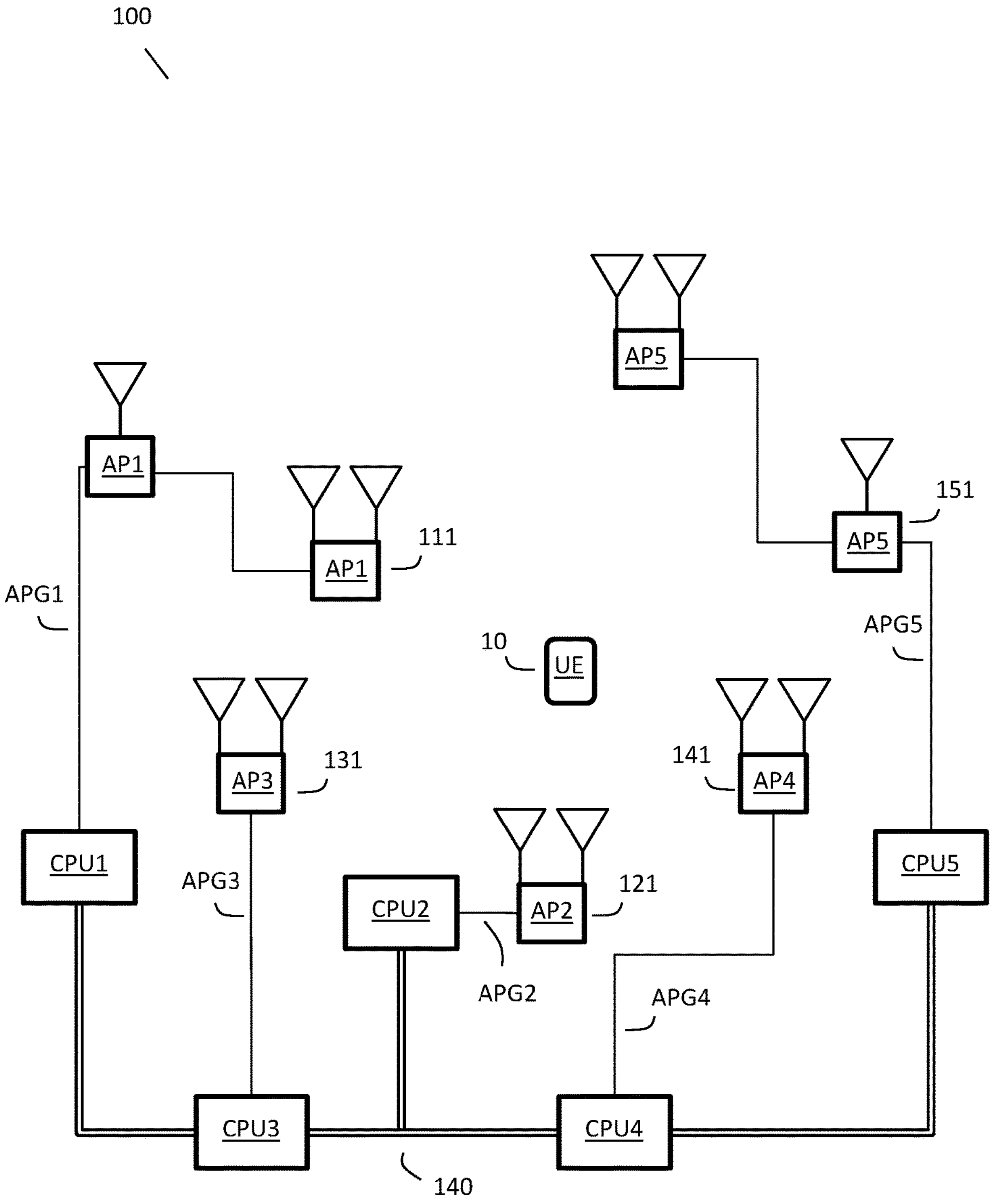
FIG. 1 schematically illustrates a wireless network according to an example in which the proposed solution may be set out.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

FIG. 1 schematically illustrates a scenario in a wireless communication system in which the presented solutions may be set out. A wireless network 100 is configured as a cell-free architecture. As shown in the figure, the system comprises single or multi antenna Access Points (APs). In the drawing, APs 111, 121, 131, 141 and 151 are indicated by way of example. Each AP may form part of at least one Access Point Group (APG). An APG may contain one or more APs connected to a serving control unit (Central Processing Unit, CPU) through a network connection, which may comprise a wired connection or a wireless connection, or a combination of the two. With reference to FIG. 1, by way of example, 5 different APGs are shown, APG1-APG5. Here, APG1 comprises two AP1s served by CPU1, whereas for example APG2 comprises only a single AP2 served by CPU2, and so on. The CPUs of the respective APG are interconnected through a network connection 140, indicated by a double line in the drawing. The network connection 140 is further typically connected to other networks, such as the Internet. Note that although the general term AP is used herein, an AP may as well be a TRP, a base station such as a gNB, a panel, or other transmission node.

A UE 10 located within range of the wireless network 100 is configured to measure received signal power on reference signals, such as for example one or more synchronization signals of a synchronization signal block (SSB) transmitted by one or more AP groups (APGs). All APs of the same APG transmit the same SSB signals using the same time-frequency resources and the same transmitter ID. The received signal strength may for example correspond to received signal reference power (RSRP), received signal strength indicator (RSSI), layer-1 RSRP or any other performance metric known to the UE.

For the UE 10, an APG is transparent in the sense that UE 10 is not aware of how many APs are in an AP group. From the UE 10 perspective, the signals transmitted by the APs in an APG appear as if a single AP transmitted the signals. If each AP group contains a single AP, then each AP then transmits separate SSB signals.

Before proceeding with further details of the proposed solution, a description of various elements which may form part of the proposed solution will be outlined.

Figure 2:
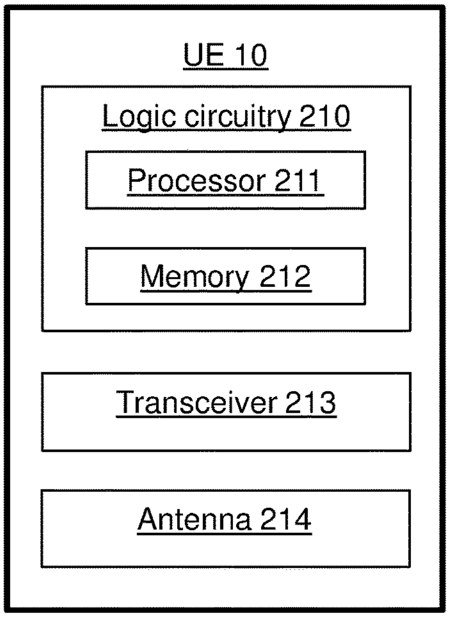
FIG. 2 schematically illustrates a wireless terminal configured to operate in accordance with the proposed solution as laid out herein.

FIG. 2 schematically illustrates a UE 10 for use in a wireless network 100 as presented herein, and for carrying out the method steps as outlined. The UE 10 may be a terminal selected from the group comprising at least handheld device, mobile device, robotic device, smartphone, laptop, drone, tablet computer, wearable devices, IoT (Internet of Things) devices, smart meters, communication modems/access points, navigation devices (GPS units), cameras, CAM recorder etc.

The UE 10 may comprise a wireless transceiver 213, such as a chipset, for communicating with other entities of the radio communication network 100, such as the APGs of the wireless network 100. The wireless transceiver 213 may thus include a radio transmitter and a radio receiver for communicating through at least an air interface on a radio channel.

The UE 10 further comprises logic circuitry 210 configured to communicate data and control signaling via the radio transceiver on the radio channel. In various embodiments, the logic circuitry 210 forms part of the transceiver 213.

The logic circuitry 210 may include a processing device 211, including one or multiple processors, microprocessors, data processors, co-processors, and/or some other type of component that interprets and/or executes instructions and/or data. Processing device 211 may be implemented as hardware (e.g., a microprocessor, etc.) or a combination of hardware and software (e.g., a system-on-chip (SoC), an application-specific integrated circuit (ASIC), etc.). The processing device 211 may be configured to perform one or multiple operations based on an operating system and/or various applications or programs.

The logic circuitry 210 may further include memory storage 212, which may include one or multiple memories and/or one or multiple other types of storage mediums. For example, memory storage 212 may include a random access memory (RAM), a dynamic random access memory (DRAM), a cache, a read only memory (ROM), a programmable read only memory (PROM), flash memory, and/or some other type of memory. Memory storage 212 may include a hard disk (e.g., a magnetic disk, an optical disk, a magneto-optic disk, a solid state disk, etc.).

The memory storage 212 is configured for holding computer program code, which may be executed by the processing device 211, wherein the logic circuitry 210 is configured to control the UE 10 to carry out any of the method steps as provided herein. Software defined by said computer program code may include an application or a program that provides a function and/or a process. The software may include device firmware, an operating system (OS), or a variety of applications that may execute in the logic 210 circuitry.

The UE 10 may further comprise an antenna 214, such as an antenna array. The UE 10 may further comprise other elements or features than those shown in the drawing or described herein, such as a positioning unit, a power supply, a casing, a user interface etc.

Figure 3:
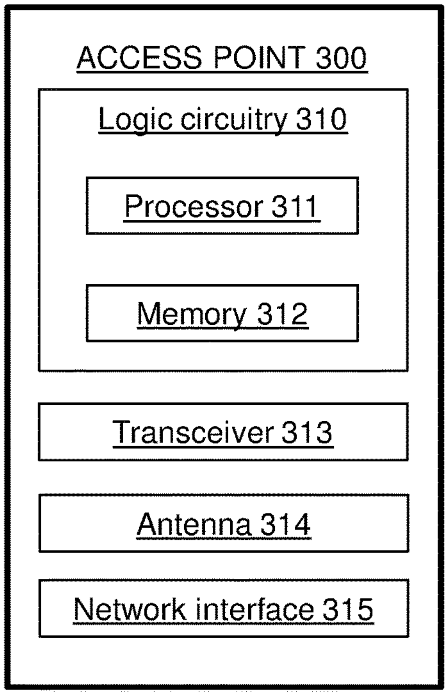
FIG. 3 schematically illustrates an access point configured to operate in accordance with the proposed solution as laid out herein.

FIG. 3 schematically illustrates an AP 300 of the wireless network 100, adapted to wirelessly communicate with UEs such as the UE 10, and configured for carrying out the associated method steps as outlined. This embodiment is consistent with the scenario of FIG. 1, wherein any of the APs of FIG. 1, such as APs 111, 121, 131, 141, 151, may be configured as the AP 300.

The AP 300 may comprise a wireless transceiver 313 for communicating with other entities of the wireless network 100, such as the UE 10, through at least an air interface on a radio channel. The transceiver 313 of the AP 300 be connected to an antenna 314, such as an antenna array.

The AP 300 further comprises logic circuitry 310 configured to control at least the wireless transceiver 313 to communicate data on the radio channel.

The logic circuitry 310 may include a processing device 311, including one or multiple processors, microprocessors, data processors, co-processors, and/or some other type of component that interprets and/or executes instructions and/or data. Processing device 311 may be implemented as hardware (e.g., a microprocessor, etc.) or a combination of hardware and software (e.g., a system-on-chip (SoC), an application-specific integrated circuit (ASIC), etc.). The processing device 311 may be configured to perform one or multiple operations based on an operating system and/or various applications or programs.

The logic circuitry 310 may further include memory storage 312, which may include one or multiple memories and/or one or multiple other types of storage mediums. For example, memory storage 312 may include a random access memory (RAM), a dynamic random access memory (DRAM), a cache, a read only memory (ROM), a programmable read only memory (PROM), flash memory, and/or some other type of memory. Memory storage 312 may include a hard disk (e.g., a magnetic disk, an optical disk, a magneto-optic disk, a solid state disk, etc.).

The memory storage 312 is configured for holding computer program code, which may be executed by the processing device 311, wherein the logic circuitry 310 is configured to control the AP 300 to carry out any of the method steps as provided herein. Software defined by said computer program code may include an application or a program that provides a function and/or a process. The software may include device firmware, an operating system (OS), or a variety of applications that may execute in the logic circuitry 310.

The AP 300 further comprises a network interface 315 for establishing a network connection to one or more APs comprised in a common APG, and to at least one control unit (CPU) serving the APs of the APG. The network interface may be configured for wired connection to other APs and the CPU or optionally be connected to the antenna 314 for wireless connection to other APs. The logic circuitry 310 may comprise logic and control circuitry for wireless transmission and reception over an air interface, and possibly logic and control circuitry or using the same logic circuitry to communicate with other APs and the control unit over the network interface 315.

Figure 4:
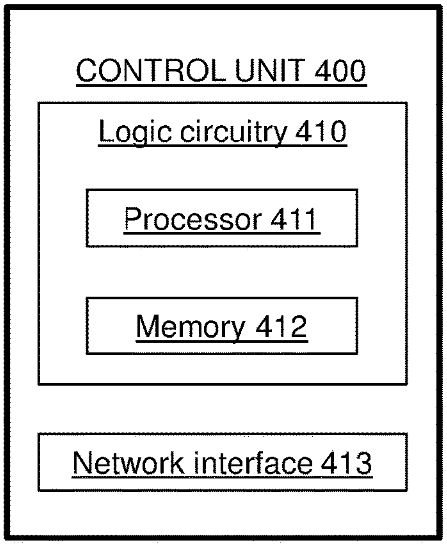
FIG. 4 schematically illustrates a control unit for an access point configured to operate in accordance with the proposed solution as laid out herein.

FIG. 4 schematically illustrates a control unit 400, also referred to as CPU 400 for short herein, of the wireless network 100. The CPU 400 is adapted to control at least one APG, which as such comprises one or more APs 300.

The CPU 400 CPU comprises logic circuitry 410 for modifying APG connections, resource allocation decisions etc., and for communicating with other CPUs over the network connection 140. This embodiment is consistent with the scenario of FIG. 1, wherein any of the CPUs of FIG. 1, such as CPU1, CPU2, CPU3, CPU4, CPU5, may be configured as the CPU 400.

The logic circuitry 410 may include a processing device 411, including one or multiple processors, microprocessors, data processors, co-processors, and/or some other type of component that interprets and/or executes instructions and/or data. Processing device 411 may be implemented as hardware (e.g., a microprocessor, etc.) or a combination of hardware and software (e.g., a system-on-chip (SoC), an application-specific integrated circuit (ASIC), etc.). The processing device 411 may be configured to perform one or multiple operations based on an operating system and/or various applications or programs.

The logic circuitry 410 may further include memory storage 412, which may include one or multiple memories and/or one or multiple other types of storage mediums. For example, memory storage 312 may include a random access memory (RAM), a dynamic random access memory (DRAM), a cache, a read only memory (ROM), a programmable read only memory (PROM), flash memory, and/or some other type of memory. Memory storage 312 may include a hard disk (e.g., a magnetic disk, an optical disk, a magneto-optic disk, a solid state disk, etc.).

The memory storage 412 is configured for holding computer program code, which may be executed by the processing device 411, wherein the logic circuitry 410 is configured to control the CPU 400 to carry out any of the method steps as provided herein. Software defined by said computer program code may include an application or a program that provides a function and/or a process. The software may include device firmware, an operating system (OS), or a variety of applications that may execute in the logic circuitry 410.

The CPU 400 further comprises a network interface 413 for establishing a network connection to one or more APs comprised in a common APG. The CPU 400 may further operate the network interface 413 to establish a network connection 140 to other CPUs and to other networks. The network interface 413 may in this context be used for wired connection, or optionally for wireless connection.

With reference to FIG. 1, the UE 10 is configured to obtain measurements of signal strength, such as received signal power, of reference signals transmitted from various APGs. Such measurements are used inter alia in the context of initial access to the wireless network.

Figure 5:
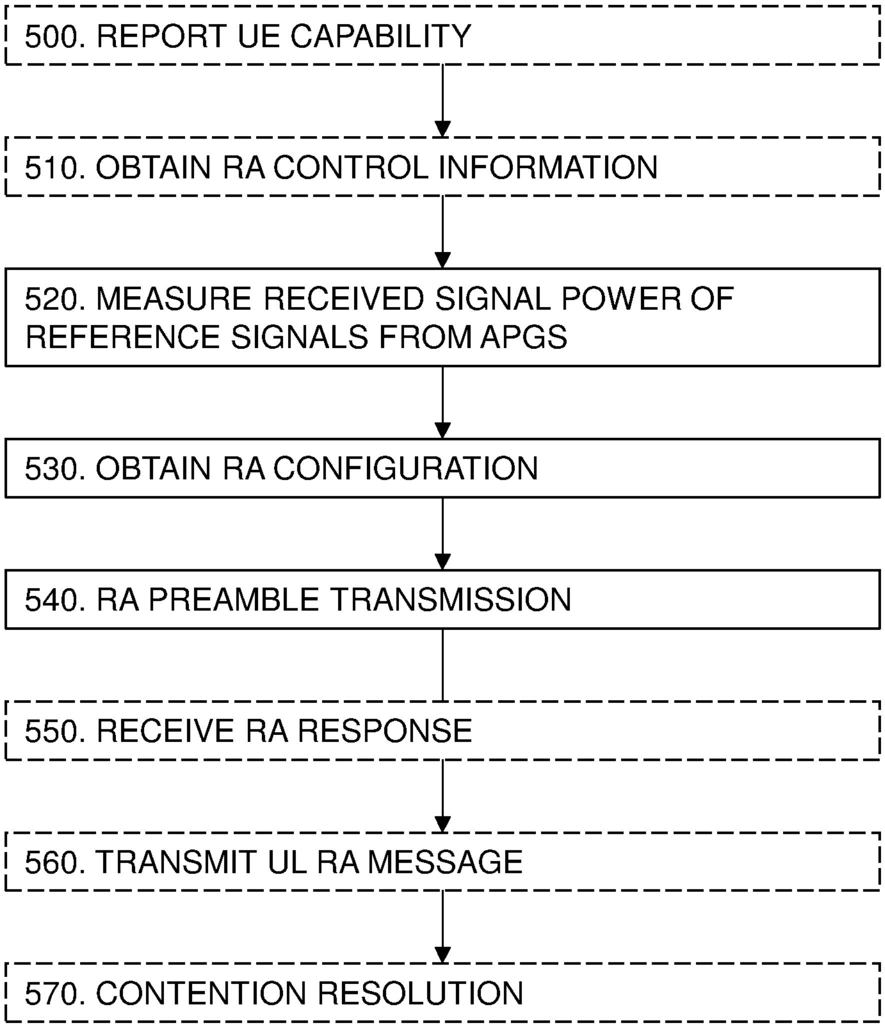
FIG. 5 shows a flow chart of various steps carried out by a UE in accordance with a method of the proposed solution as laid out herein.

FIG. 5 is a flowchart providing various steps included in different examples of the proposed solution, as set out in the UE 10. According to a first aspect, the proposed solution thus relates to a method carried out in the UE 10 for initial access to the wireless network 100, which comprises a plurality of APGs 110, 120, 130. The method comprises:

520: measuring received signal power of reference signals from said APGs, wherein each APG transmits said reference signals using different radio resources.

530: obtaining random access, RA, configuration associated with one or more of said APGs.

540: initiating RA preamble transmission, based on said RA configuration, to each of the APGs which meet a predetermined criterion based on the measured received signal power.

Figure 6:
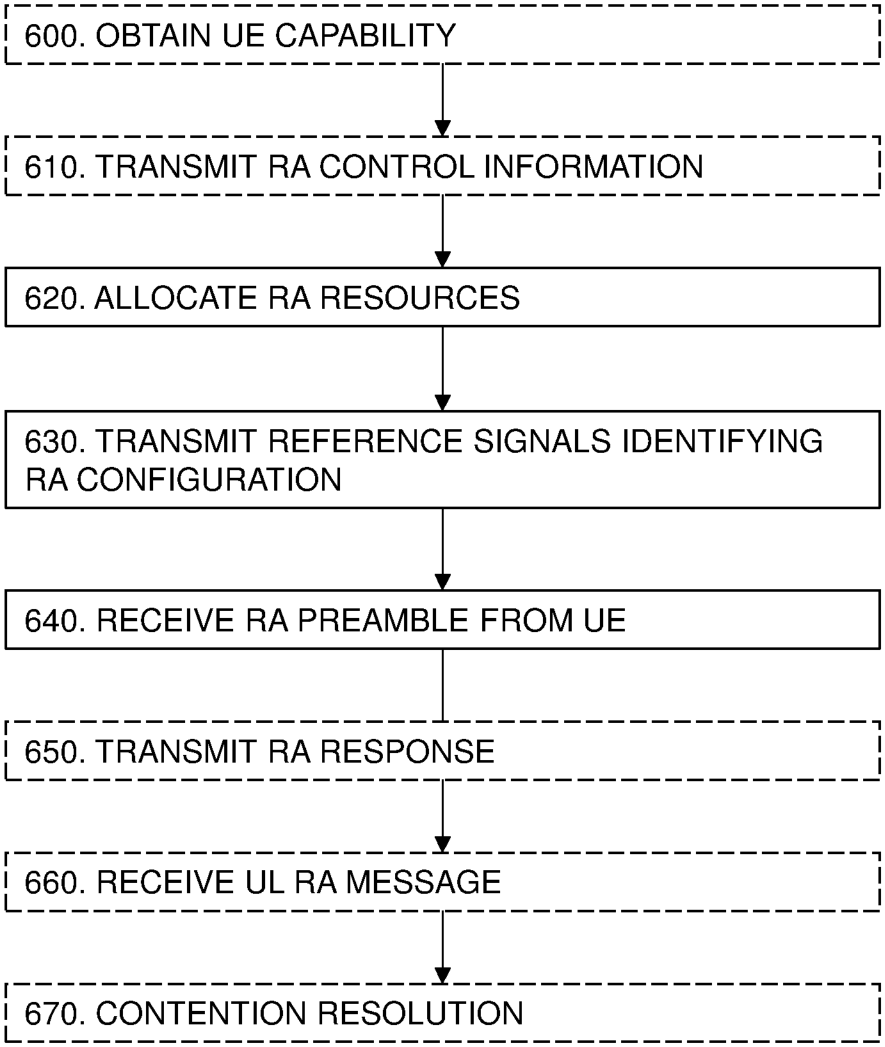
FIG. 6 shows a flow chart of various steps carried out by a wireless network in accordance with a method of the proposed solution as laid out herein.

FIG. 6 is a flowchart providing various steps included in different examples of the proposed solution, as set out in the wireless network 100. According to a second aspect, the proposed solution thus relates to a method carried out in the wireless network 100, which comprises a plurality of APGs, for facilitating UE initial access. The method comprises:

620: allocating RA resources for RA preamble reception.

630: transmitting, by said APGs, reference signals usable for UE obtainment of RA configuration which identifies said RA resources, wherein each APG transmits said reference signals using different radio resources.

640: receiving at least one RA preamble from the UE 10, wherein the UE 10 is configured for RA preamble transmission to each APG for which measured received signal power of said reference signals meets a predetermined criterion.

By means of the proposed solution, as outlined with reference to FIGS. 5 and 6, the wireless network 100 is configured to obtain information of signal reception in the UE 10 from different APGs early in the initial access procedure, which may be used for controlling the initial access procedure. In various examples, the wireless network 100 is configured to select one APG from the ones that meet the predetermined criterion to continue the RA procedure.

Examples of the proposed solution as outlined in FIGS. 5 and 6, and further details related to examples of the method, will now be described.

In a scenario based on legacy 3GPP solutions, an SSB signal transmitted 630 by an APG may contain a primary synchronization signal (PSS), a secondary synchronization signal (SSS) and a physical broadcast channel (PBCH). The PBCH may comprise a master information block (MIB), including information related to a particular APG, information related to the wireless network 100, and also information related to one or more system information blocks (SIBs). The SIBs may as such comprise PRACH related information which forms part of the RA configuration.

As an example, Table 1 shows the received signal power measured by the UE 10 on SSB signals transmitted 630 by different APGs, in a scenario of FIG. 1.

TABLE 1

An example of received SSB signal strength for four different APGs.

| | |
|---|---|
| APG1 | −98 dBm |
| APG2 | −87 dBm |
| APG3 | −100 dBm |
| APG4 | −90 dBm |

This example thus relates to a scenario where the UE 10 detects 520 SSBs from APG1-APG4, where the strongest measured signal is detected from APG2.

According to one aspect of the proposed solution, the UE 10 obtains information to perform RACH procedure associated with one or more APGs. This information may be partially predefined in a standard specification. According to some examples, all UEs, or all UEs of a certain specified type or group, supporting a version of a technical standard and future version of that standard may be configured to use this feature by default. Alternatively, the information to perform RACH to multiple APGs is indicated by network signaling. An indication that this type of RACH procedure is supported by the wireless network may e.g. be provided by broadcasting, e.g. as SIB. The control information which enables the UE to determine RA preamble transmission to more than one APG may thus be obtained 530 in conjunction with reading MIB or SIB upon based on a detected and measured signal from an APG, or may be previously received by default configuration or by earlier obtainment 510 of MIB or SIB from the wireless network 100. The obtained information configures the UE 10 for RA preamble transmission to all APGs that meet the predetermined criterion, as opposed to RA transmission to only the strongest APG according to legacy behavior.

Once the information, forming part of the RA configuration, to perform RACH procedure associated with one or more APGs is obtained, the UE 1 is thus configured to perform RACH associated with one or more APGs.

The UE obtains RACH related parameters associated with one or more APGs, as part of the RA configuration. This may be obtained from decoding one or more SIBs transmitted by APGs, identified 630 by the transmitted reference signals, i.e. the associated SSB. The RA configuration may thus comprise RACH related parameters providing information about the RACH preamble to be sent in msg1, the allocated 620 RACH resources over which the UE shall transmit the RACH preamble, parameters associated with RACH response from the wireless network 100, etc. The RACH preambles, the RACH resources associated with RACH preambles and the RACH response related parameters may be allocated by the CPU serving the APG which transmits 630 the associated reference signal SSB.

Figure 7:
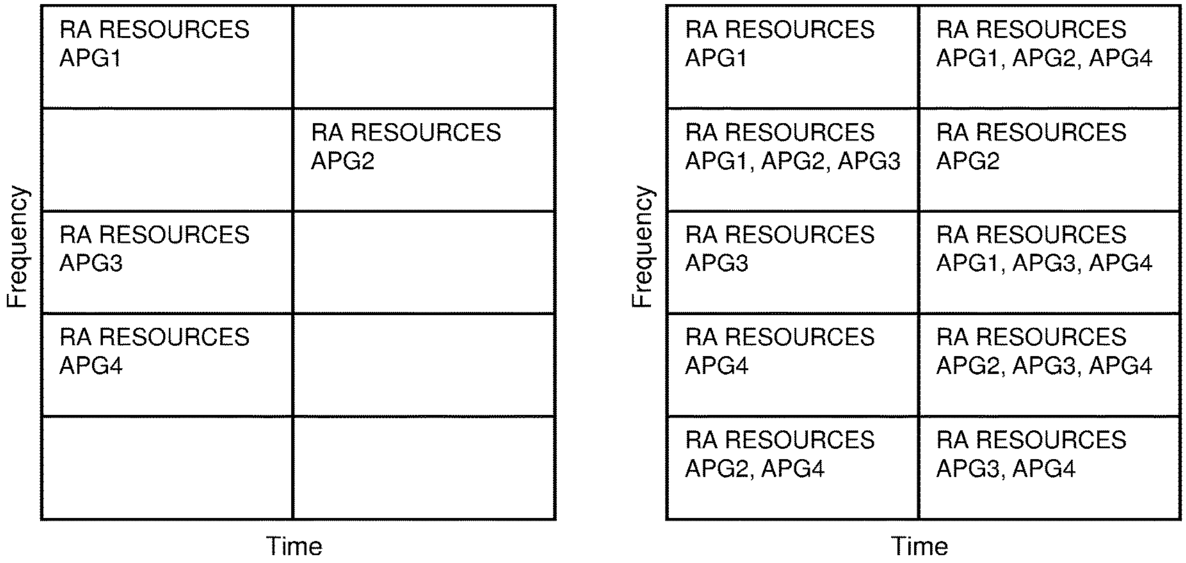
FIG. 7 illustrates various examples of resource allocation associated with a random access procedure, in accordance with the proposed solution.

FIG. 7 illustrates, by way of example, how RACH resources may be allocated 620 in time and frequency in the wireless network 100 in accordance with various examples of the proposed solution. The CPUs can be configured to allocate RACH resources to each APG separately as shown in the lefthand side of FIG. 7, or some RACH resources may be common to one or more APGs as shown in the righthand side of FIG. 7. The resource allocation may be obtained in the UE by decoding SIB from the wireless network.

The UE can thus be configured to perform RACH procedure by transmitting RACH preamble on the RACH resources associated with one or more AP groups. Based on the information of the example from Table 1, in a traditional cellular system, the UE transmits the RACH preamble on the PRACH resources associated with APG2 and waits for the response from APG2. However, in the proposed invention, the UE 10 may be configured according to different options, using a predetermined criterion associated with measured signal strength. In some examples, the predetermined criterion comprises a threshold test, wherein any APG from which signal strength exceeding a certain power threshold level is considered to meet the predetermined criterion. The threshold level may be a power level configured by the wireless network and indicated in e.g. SIB, or determined by default specification. In another example, the threshold level may be a relative, or implicit, threshold level wherein the predetermined criterion identifies the number of APGs for which highest measured received power is determined, such as the APGs for which the three strongest received power is measured. A threshold value (explicit or implicit) may thus be obtained by the UE 10, and then UE 10 selects the AP groups which meet the predetermined criterion and initiates the RACH procedure by transmitting 540 a preamble to each of the AP groups. According to an example useful for understanding this concept, the predetermined criterion may identify a threshold level value of −99 dBm (cf. Table 1).

Figure 8:
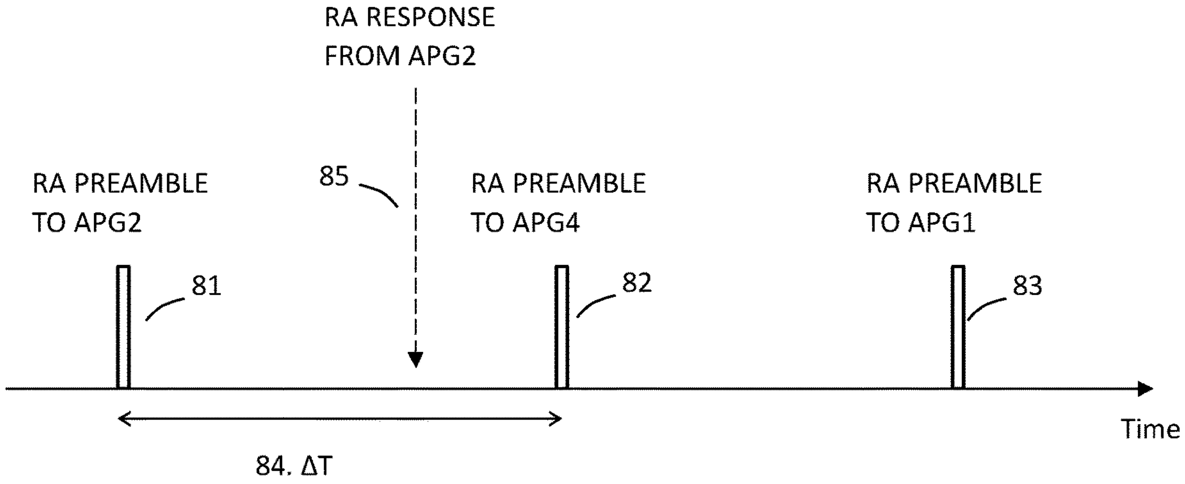
FIG. 8 illustrates a diagram of random access transmissions in accordance with one example of the proposed solution.

A first implementation of this aspect is illustrated in FIG. 8. According to this example, the UE 10 is configured to initiate RA preamble transmission 540 by transmitting a first RACH preamble 81 on resources associated with APG2 (strongest received signal power from Table 1). The UE is further configured to transmit a second RACH preamble 82 on resources associated with APG4 (second best received signal power). This may be carried out at a later time, wherein a time $\Delta T$ separates the transmissions based on the resource allocation of FIG. 7. The UE further transmits a third RACH preamble 83 to APG1. The rules defining the order in which UE 10 transmits the RACH preamble on resources associated with AP groups may be specified in a standard specification. Where a RACH response 85 is received prior to a configured subsequent RACH preamble transmission 82, that configured subsequent RACH preamble transmission 82 may be cancelled in certain examples.

The advantage with the proposed solution is that UE 10 can establish a faster connection to one of the AP groups and convey information about its SSB measurements of all APGs meeting the predetermined criterion to one or more APGs during the initial access itself, leading to a faster decision by the CPUs to allocate one or multiple APGs to serve the UE 10.

Figure 9:
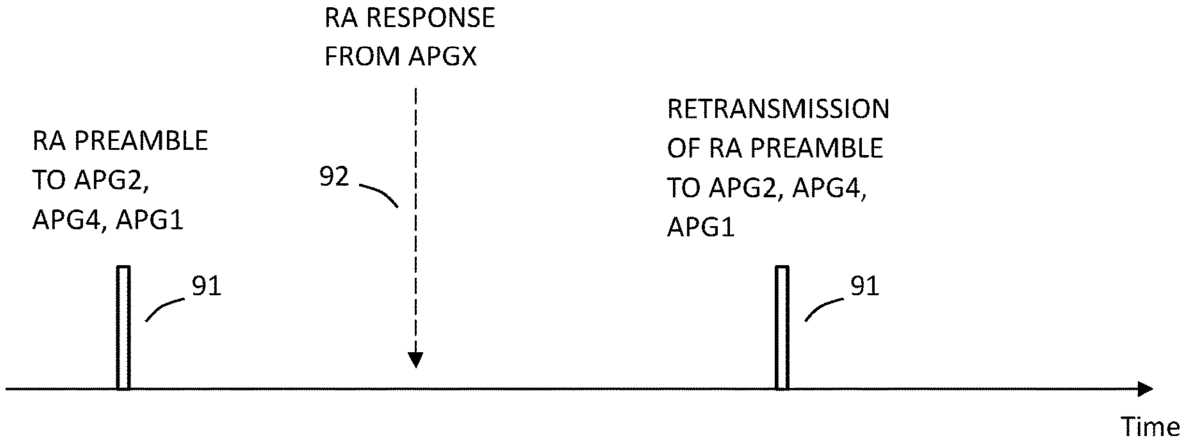
FIG. 9 illustrates a diagram of random access transmissions in accordance with one example of the proposed solution.

A second implementation of this aspect is illustrated in FIG. 9, where RACH resources are allocated in accordance with the righthand side (RHS) of FIG. 7. According to this example, the UE 10 is configured to initiate RA preamble transmission 540 by transmitting a first RACH preamble 91 on resources commonly allocated for APG2, APG4 and APG1 (top right resource on RHS of FIG. 7). The advantage with this implementation, in addition to the advantages obtained by the first implementation, is further that power may be saved compared to the first implementation, as UE 10 only needs to transmit once. Also, the transmission from the UE is monitored by APG1, APG2 and APG4 at the same time, improving the probability of detection of the RACH preamble transmitted by the UE 10.

In various examples of the proposed solution, the UE 10 is configured to transmit, in association with each initiated RACH preamble transmission, an UL message indicating the measured received signal power for all of the APGs which meet the predetermined criterion. The UE 10 thus sends information regarding its SSB measurements associated with multiple APGs. With reference to the discussed example, this may indicate measured received signal power for APG1, APG2, and APG4. Where the predetermined criterion identifies a relative, or implicit, threshold as discussed, the indication of the measured received signal power needs only identify which APGs meet that criterion, e.g. by identifying the three APGs from which the strongest signal measurement is obtained.

The information indicating the measured received signal power for all of the APGs which meet the predetermined criterion is further conveyed to one or more APGs during the initial access, i.e. AP to AP communication via the network interface 315, and/or through the CPUs using the network connection 140.

With reference to legacy RACH procedure, the UE 10 may be configured, by the obtained RA configuration or by specified default, to send this information to the wireless network 100 using either msg1 or msg3 of 4-step RACH procedure, or msgA in the case of 2-step RACH procedure, to the one or more APGs. The APGs may forward this information to the respective CPU, which assigns which AP groups can serve the UE, and/or decide on which AP group should respond to the UE 10 with a DL message in response to the UL message comprising the information. Below, we describe various example scenarios.

Example 1: UE sends 540 independent RACH preambles to each APG along with the SSB measurement information associated with one or more APGs during msg1 or msgA. In this context, the UE 10 is configured to transmit 540 an UL message corresponding to msg1, comprising the RACH preamble and indicating the measured received signal power for all of the APGs which meet the predetermined criterion. This may be carried out using the lefthand allocation of FIG. 7, or the individually allocated resources of the righthand allocation of FIG. 7.

Example 2: UE sends 540 common RACH preamble to multiple APGs along with the SSB measurements information associated with one or more APGs during msg1 or msgA. This may be carried out using one of the commonly allocated resources of the righthand allocation of FIG. 7.

In the context of both these examples, the UE 10 is configured to transmit 540 an UL message corresponding to msg1, comprising the RACH preamble and indicating the measured received signal power for all of the APGs which meet the predetermined criterion. The CPUs of the wireless network 100 may determine to respond to the RACH preamble(s) by transmitting 650 a DL response message, msg2, using a determined APG of said APGs, a downlink, DL, message in response to the UL message, wherein said one APG is determined based on said indication.

Example 3: The UE 10 sends 540 independent RACH preamble to each APG during msg1. This may be carried out using the lefthand allocation of FIG. 7, or the individually allocated resources of the righthand allocation of FIG. 7. One of the APGs to which the UE sent independent RACH preambles responds 650 with a msg 2 to the UE 10, and then in msg 3 UE sends 560 the SSB measurement information associated with one or more APGs to the APG from which the UE 10 received the msg2.

Example 4: The UE 10 sends 540 a common RACH preamble to multiple APGs along with the SSB measurements information associated with one or more APGs during msg1. One of the APGs to which the UE 10 sent a common RACH preamble responds 650 with a msg 2 to the UE 10. In msg 3, the UE sends 560 the SSB measurement information associated with one or more AP groups to the AP group from which UE received msg2.

In the context of both these examples, the UE 10 is configured to receive 550 an RA response message responsive to the RA preamble transmission, and to transmit 560 an UL message indicating the measured received signal power for all of the APGs which meet the predetermined criterion.

In various examples, the UE 10 may obtain 510, 530 RA configuration identifying monitoring window configurations for an RA response 650. This relates in particular to the example where the UE 10 is configured to transmit independent RACH preambles to each AP group meeting the predetermined criterion. The monitoring window configurations defines how the UE should monitor for msg2 from each of the APG.

Figure 10A:
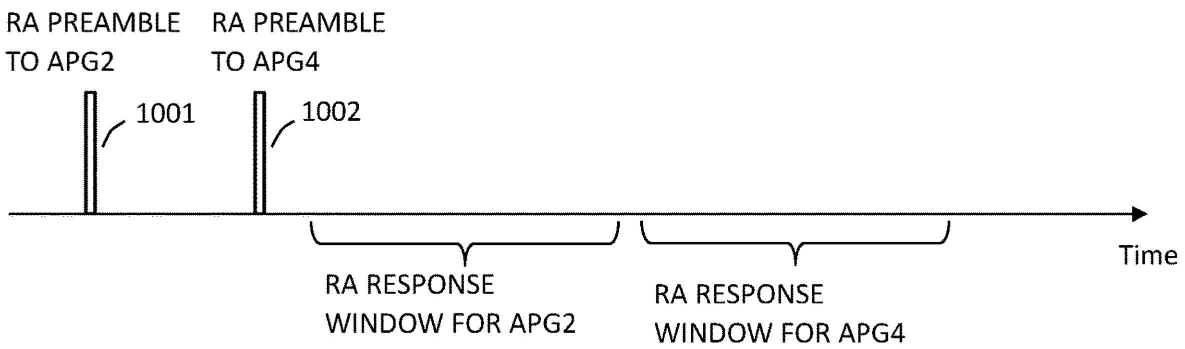
FIGS. 10A and 10B illustrate different examples of monitoring windows for a random access response message in accordance with the proposed solution.
Figure 10B:
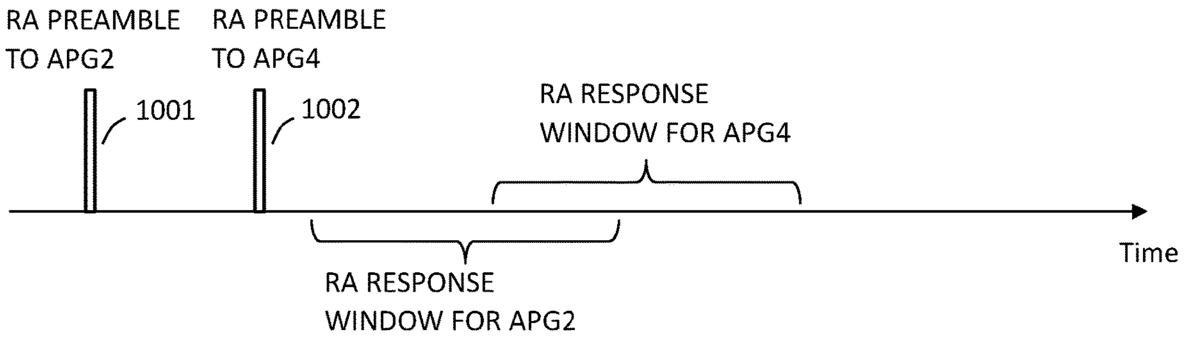

FIGS. 10A and 10B show two illustrative examples showing non-overlapping and overlapping RA response windows configured for the UE 10. The UE 10 sends mgs1 1001, 1002 containing RACH preamble and optionally SSB measurements data to AP2 and AP4 in one or more uplink slots. It shall be noted that even though the examples in the drawings indicate that the two preambles 1001 and 1002 are sent before the RA response window starts for AP2, an alternative implementation may provide for transmission of the msg1 1002 to AP4 during uplink slots in the RA response window associated with AP2.

The UE 10 starts monitoring the downlink PDCCH (Physical Downlink Control Channel) for msg2 from AP2, and if it did not receive the msg2 in the configured window, in a traditional cellular initial access procedure, the UE sends another msg1 to AP2. However, according to the proposed solution in case of non-overlapping RA response windows as shown in FIG. 10A, the UE may start monitoring the PDCCH for msg2 from the AP4 before initiating retransmission of msg1 to AP2. In case of overlapping RA response windows, as shown in FIG. 10B, the UE 10 is configured to simultaneously monitor for msg2 from multiple APGs using a non-overlapping subset of its downlink receive antennas 214.

According to some examples, the UE 10 transmits 500, 540, to the wireless network 100, an indication of UE support of one of overlapping or non-overlapping monitoring windows for an RA response. This may be obtained by UE capability reporting 500, or in conjunction with the RACH preamble transmission 540. In some examples, the RA configuration, e.g. obtained through SIB, may identify optional monitoring windows configurations for an RA response. The indication transmitted with the RACH preamble may thus identify one of said monitoring windows configurations, such as one of overlapping or non-overlapping.

Various examples of the proposed solution have been outlined in the foregoing. The functions and features of the examples provided may be combined in any way, where not clearly contradictory.

The invention claimed is:

1. Method carried out in a user equipment (UE) for initial access to a wireless network comprising a plurality of access point groups (APGs), the method comprising:

measuring received signal power of reference signals from said APGs, wherein each APG transmits said reference signals using different radio resources;

obtaining random access (RA) configuration associated with one or more of said APGs;

initiating RA preamble transmission, based on said RA configuration, to each of the APGs which meet a predetermined criterion based on the measured received signal power.

2. The method of claim 1, comprising:

transmitting, in association with each initiated RA preamble transmission, an uplink (UL) message indicating the measured received signal power for all of the APGs which meet the predetermined criterion.

3. The method of claim 2, wherein said UL messagecomprises said RA preamble transmission.

4. The method of claim 2, comprising:

receiving an RA response message responsive to the RA preamble transmission;

wherein the UL message is transmitted based on said RA response message.

5. The method of claim 1, wherein the RA configuration identifies different resources for the RA preamble transmission to at least two of the APGs which meet the predetermined criterion.

6. The method of claim 1, wherein the RA configuration identifies commonly allocated resources for the RA preamble transmission to at least two of the APGs which meet the predetermined criterion.

7. The method of claim 1, comprising:

transmitting, to the wireless network, an indication of UE support of one of overlapping or non-overlapping monitoring windows for an RA response.

8. The method of claim 7, wherein said RA configuration identifies optional monitoring windows configurations for an RA response, and wherein said indication identifies one of said monitoring windows configurations.

9. The method of claim 1, comprising:
obtaining control information which enables the UE to determine RA preamble transmission to more than one APG based on said predetermined criterion.

10. The method of claim 1, wherein said predetermined criterion comprises a power threshold criterion.

11. Method, carried out in a wireless network comprising a plurality of access point groups (APGs) for facilitating initial access of a user equipment (UE) wherein the method comprises:
allocating random access (RA) resources for RA preamble reception;
transmitting, by said APGs, reference signals usable for UE obtainment of RA configuration which identifies said RA resources, wherein each APG transmits said reference signals using different radio resources;
receiving at least one RA preamble from the UE, wherein the UE is configured for RA preamble transmission to each APG for which measured received signal power of said reference signals meets a predetermined criterion.

12. The method of claim 11, comprising:
receiving in one of the APGs, in association with the received RA preamble, an uplink (UL) message comprising an indication of the measured received signal power for all of the APGs which meet the predetermined criterion.

13. The method of claim 12, comprising:
transmitting, using a determined APG of said APGs, a downlink (DL) message in response to the UL message, wherein said one APG is determined based on said indication.

14. The method of claim 12, wherein said UL message comprises said RA preamble.

15. The method of claim 12, comprising:
transmitting, by a first APG in which the RA preamble is received, an RA response message to the UE;
wherein the UL message is received in said first APG based on said RA response message.

16. The method of claim 11, wherein said RA resources are allocated in different time resources for different APGs.

17. The method of claim 11, wherein said RA resources comprises RA resources commonly allocated to at least two of said APGs.

18. The method of claim 11, comprising:
receiving an indication of UE support for one of overlapping or non-overlapping monitoring windows for an RA response;
scheduling transmission of the RA response in a configured monitoring window dependent on said indication.

19. The method of claim 18, wherein said RA configuration identifies optional monitoring windows configurations for an RA response, and wherein said indication identifies one of said monitoring windows configurations.

20. The method of claim 11, comprising:
transmitting control information which configures the UE for RA preamble transmission to more than one APG based on the predetermined criterion.

* * * * *